US008823649B2

(12) United States Patent
McArdle (10) Patent No.: US 8,823,649 B2
(45) Date of Patent: Sep. 2, 2014

(54) POINTING DEVICE HAVING ROTATIONAL SENSORS (75) Inventor: James McArdle, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1763 days.

(21) Appl. No.: 11/538,489

(22) Filed: Oct. 4, 2006

(65) Prior Publication Data
US 2008/0084387 A1 Apr. 10, 2008

(51) Int. Cl.
G09G 5/08 (2006.01)
G06F 3/02 (2006.01)
G05G 9/047 (2006.01)

(52) U.S. Cl.
CPC .... *G06F 3/0213* (2013.01); G05G 2009/04762 (2013.01)
USPC ........... 345/161; 345/168; 345/160; 345/157; 200/5 A; 200/6 A; 200/511; 200/513; 200/333; 341/34; 341/22; 341/27

(58) Field of Classification Search
CPC ................................ G09G 5/08; G06F 3/0213
USPC ................. 345/156, 160, 161, 168, 157, 184; 700/83, 84, 85; 463/36, 37, 38, 46; 341/34, 22, 27; 200/5 A, 6 A, 511, 513, 200/333
See application file for complete search history.

(56) References Cited

U.S. PATENT DOCUMENTS

| 5,798,748 | A | * | 8/1998 | Hilton et al. | 345/156 |
| 5,821,920 | A | * | 10/1998 | Rosenberg et al. | 345/156 |
| 5,889,507 | A | * | 3/1999 | Engle et al. | 345/161 |
| 6,295,050 | B1 | * | 9/2001 | Kumhyr | 345/161 |
| 6,512,509 | B1 | * | 1/2003 | McVicar | 345/161 |
| 6,573,885 | B1 | * | 6/2003 | McVicar | 345/161 |
| 2002/0057257 | A1 | * | 5/2002 | Hoggarth | 345/161 |

* cited by examiner

Primary Examiner — Lun-Yi Lao
Assistant Examiner — Olga Merkoulova
(74) Attorney, Agent, or Firm — John D. Flynn; Jeffrey L. Streets

(57) ABSTRACT

A pointing device and method for providing both translational and rotational input to a computer, to manipulate graphical objects. In one embodiment, a pointing stick is cantilevered to a base. One or more translational sensors are coupled to the pointing stick to generate translational signals in response to lateral forces applied to the pointing stick. One or more rotational sensors are coupled to the pointing stick to generate rotational signals in response to rotational forces applied to the pointing stick. The rotational sensor may sense torque, such as with a piezoelectric sensor configured to detect rotational strain on a fixed pointing stick. The rotational sensor may alternatively sense rotational displacement, such as with a potentiometer configured to detect rotation of a rotatable sleeve about a fixed shaft.

14 Claims, 5 Drawing Sheets

POINTING DEVICE HAVING ROTATIONAL SENSORS

BACKGROUND OF THE INVENTION

1. Field of the Invention

The present invention relates to a pointing device for manipulating graphical objects displayed on a computer system.

2. Description of the Related Art

A pointing device is a human interface device that generally allows a user to input spatial data to a computer. A pointing device typically interfaces with a graphical user interface (GUI) on an operating system to allow the user to provide the spatial input using physical gestures, such as point, click, and drag. While the most common pointing device is perhaps the mouse, other kinds of pointing devices include a trackball, touchpad, pointing stick, lightpen, joystick, head pointer, eye tracking devices, various kinds of digitizing tablets which use a stylus, and even a special "data glove" that translates the user's movements to computer gestures. Conventional touchpads and pointing sticks are especially common on notebook computers.

Pointing devices have become important for human interaction with a computer. Pointing devices help the computer operator control the movement of a cursor on a computer screen, select graphical objects and menu functions, and so forth, depending upon the application program being used. Many pointing devices, however, such as mice and track balls, require a user to remove one or both hands from a keyboard in order to access and operate them. This results in distraction, loss of time, and the need for space adjacent to the keyboard for their operation.

A track pad is a pointing device that emulates a mouse by sensing the motions of the user's finger over its surface and translating those motions into digital signals. A button below the track pad provides further functionality, such as allowing the user to make selections. Alternatively, the user can tap and double tap on the pad itself. The user can tap and drag on the trackpad in much the same manner as clicking and dragging with a mouse. Although track pads may be built into a keyboard, such as the region below the spacebar of a notebook computer, track pads still require that the user move their hand or hands out of a typing position.

A pointing stick is a pointing device that can desirably be operated while the user's hands remain in the typing position of a keyboard to save time and minimize distraction. A pointing stick and its associated sensor assembly are typically mounted on the sub-key surface of a keyboard such that a stick protrudes between adjacent keys, most commonly centered at the intersection of the "G", "H" and "B" keys. A nub provided at the top of the stick is typically contoured to provide a comfortable fingertip grip. To emulate mouse button signals, two microswitches and operating buttons are mounted below the space bar (i.e. toward the user), in a position convenient to the thumbs of the typing hands. The user may operate the pointing device from within a conventional typing position, avoiding the distraction, inconvenience, and other problems inherent to using a separate mouse, track ball, or joy stick. A track point requires very little displacement of the hand to move the cursor in any direction desired.

Despite the utility of the various types of conventional pointing devices, there is an ongoing need to improve user efficiency when operating a computer. Even pointing sticks, which allow the hands to remain in a typing position, can be improved in terms of functionality and efficiency. Some application programs require input that is not efficiently accommodated by existing input devices. To provide such input with conventional input devices, an application program frequently requires that the user access a drop-down menu or toolbar in order to temporarily change the operation of the pointing device. For example, in some software applications, selecting a portion of an image for copying requires a user to point and click on an image selection tool icon in the toolbar so that the pointing device may then be used for the specific purpose of selecting/sizing an image. After activating the image selection tool, the application program expects the next pair of clicks to define opposing boundaries of the desired image. Furthermore, before the image may be rotated, the user must point and click on a rotation tool icon in the toolbar in order to accomplish rotation. While this type of process achieves the necessary goal of image selection, it disrupts the continuity and flow otherwise provided with usual operation of the input device.

There remains a need for an improved input device having additional input functionality, more intuitive operation, and greater efficiency. It would be preferable for the improved input device to be conveniently accessible and retain a familiar layout, similar to that of existing pointing devices.

SUMMARY OF THE INVENTION

In a first embodiment, a pointing device is configured for providing input to a computer. A pointing member includes a body having a supported end secured to a base and a free end accessible for movement by hand. A plurality of sensors is coupled to the pointing member for sensing the movement of the body. Each sensor producing an electronic signal representative of the movement. The plurality of sensors include at least one rotational sensor configured for sensing rotational movement of the body and at least one translational sensor configured for sensing lateral displacement of the body.

In a second embodiment, a machine-accessible medium contains instructions, which when executed by a machine, cause the machine to perform operations. A rotational signal is received, representative of a rotation or a torque applied to a pointing member. A graphical element displayed on a graphical user interface is manipulated in response to the rotational signal.

In a third embodiment, a method is followed to provide input to a computer. A torque or rotation is applied about a central axis of a pointing stick. An electrical parameter is modulated in response to the torque or rotation. A rotational signal is generated in response to the modulated electrical parameter. A graphical element on a graphical user interface is manipulated in response to the rotational signal.

DETAILED DESCRIPTION OF PREFERRED EMBODIMENTS

The present invention provides an enhanced pointing stick mechanism for sensing rotational movement or forces. A user's gestures may now include rotating the pointing stick or applying a rotational force in a clockwise or counterclockwise direction with one or more fingers, in addition to translational gestures allowed by some conventional pointing sticks.

In one embodiment, the pointing stick mechanism includes at least one rotational sensor, in addition to sensors for translational up/down and left/right movements. The rotational sensor is configured for sensing torque or actual rotation about an axis of the shaft and generating a signal representative of that torque or rotation. The pointing stick is preferably configured so that the pointing stick position and/or sensed rotation/torque returns to a zero point when the rotational force is no longer being applied.

A pointing stick having a rotational sensor according to the invention is capable of recognizing more complex user gestures than a conventional pointing stick. The device may sense clockwise and counterclockwise rotation or torque, in addition to conventional forward, backward, left, right or combination movements. For example, a user could push the pointing stick forward or backward in combination with clockwise or counterclockwise rotation in order to supply both rotational and translational input to a computer. Such a rotational capability could be beneficially used in various computer applications. An example of such an application is a molecular modeling and viewing program, in which the graphical elements that represent the molecule in a simulated three-dimensional space may be manipulated.

Embodiments of the improved pointing stick mechanism will allow new gestures, as well as additional new combinations of gestures, to generate input to a computer. It is anticipated that application programs will be developed or enhanced to take advantage of these additional input capabilities. In particular, it is anticipated that the mechanism may provide alternative, more intuitive means, for providing commands to a computer and reduce the repetitive reliance on drop-down menus or toolbar icons.

The new pointing stick may be combined with a conventional keyboard, such as by centrally positioning the pointing stick between nearby keys, such as between the "G," "H" and "B" keys on a QWERTY keyboard. Alternatively, the pointing stick may be centrally positioned between split halves of a "split" ergonomic keyboard. In the latter embodiment, a larger area may be available for positioning the pointing sticking device between the split halves of the keyboard. This larger area may allow for a larger-diameter pointing sticking device, which may be optionally accessed by more than one finger for additional leverage and control. Alternatively, the pointing stick could also be positioned elsewhere on a keyboard or implemented in a standalone unit.

Figure 1:
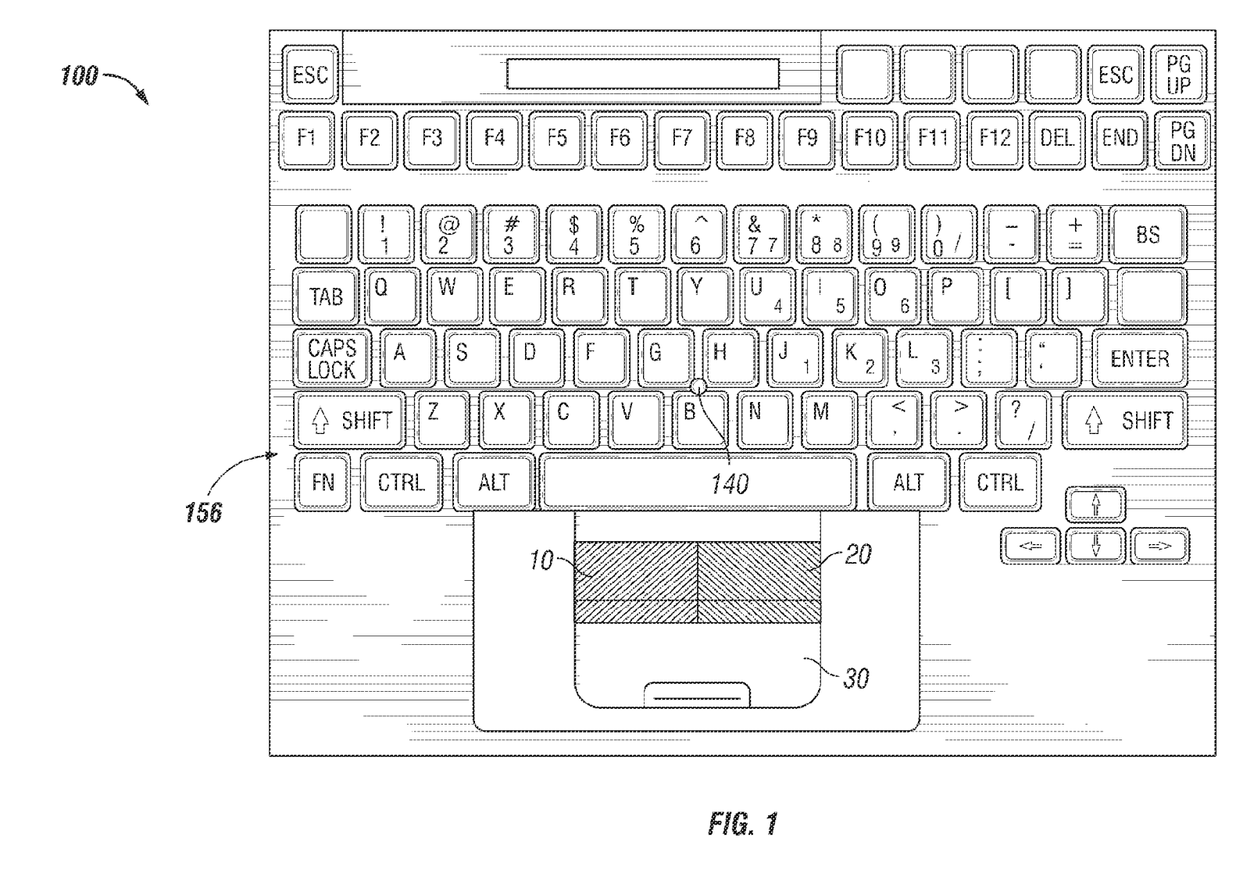
FIG. 1 is a schematic top-view diagram of an exemplary notebook computer that may include—or may be modified to include—an embodiment of a pointing stick device according to the invention.

FIG. 1 is a schematic top view of an exemplary notebook computer 100 that may include—or may be modified to include—an embodiment of a pointing stick device according to the invention. The computer 100 has a keyboard 156 with a user-accessible portion of a pointing stick 140 positioned among the keys. As shown, the pointing stick 140 is used in combination with a pair of buttons 10, 20 corresponding to the right and left buttons on a conventional mouse, and an optional third button 30. The alphanumerical keys are arranged in a so-called "QWERTY" configuration on the keyboard 156. The pointing stick 140 generally includes a cantilevered shaft extending below the keys and supported on a base beneath the keys, and is centrally positioned between keys "G," "H" and "B." A plurality of sensors that will be described in further detail below are attached to the cantilevered shaft, such as at the lower end. When a user applies a translational force to the exposed end of the pointing stick 140, the sensors detect the translational force and generate signals corresponding to these translational forces. Additionally, when a user applies a rotational force to the exposed end of the pointing stick 140, the sensors detect rotation and/or torque, and generate signals corresponding to these rotational forces. Desirably, the user can manipulate the pointing stick 140 without removing his or her hands from the "home position" on the keyboard.

Figure 2:
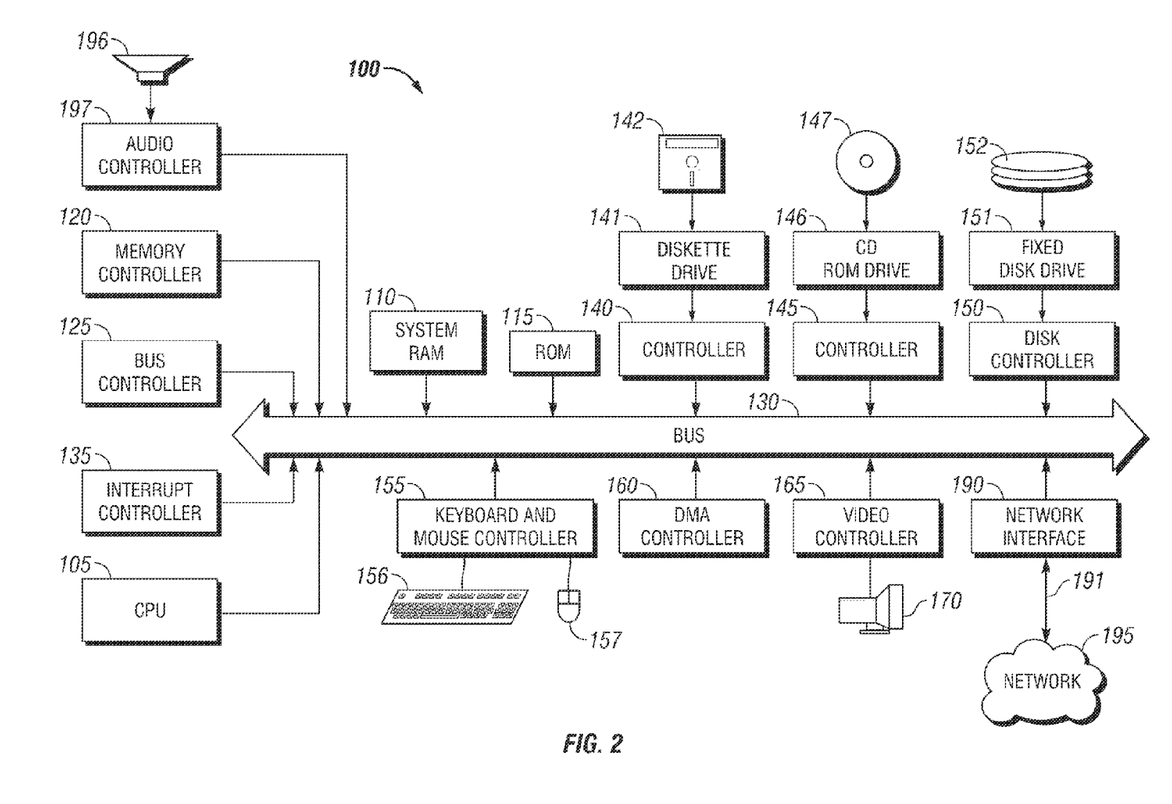
FIG. 2 illustrates a system architecture for a computer system on which the decision-making method can be implemented

FIG. 2 illustrates one embodiment of system architecture for a computer system 100, on which the decision-making method can be implemented. A discussion of the various embodiments of a pointing device may refer back to components of the computer system 100 of FIG. 2, to illustrate examples of how the pointing devices may be interconnected with the computer system 100. The computer system represented in FIG. 2 is provided for descriptive purposes only, however, and should not be considered a limitation of the invention. Although the description of the computer system 100 may refer to terms commonly used in describing particular computer systems, the description and concepts equally apply to other systems, including systems having architectures dissimilar to FIG. 2.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage of data may be provided by diskette 142, CD ROM 147, or hard drive 152. Data and software may be exchanged with computer system 100 via removable media such as diskette or CD ROM. Removable media 147 is insertable into drive 146 that is, in turn, connected to bus 130 by a controller 145. Hard disk 152 is part of a fixed disk drive 151 that is connected to bus 130 by controller 150.

User input to computer system 100 may be provided by a number of devices. For example, a keyboard 156 and mouse 157 may be connected to bus 130 by controller 155. Alternatively, the mouse 157 may be replaced by the pointing stick 140 and buttons 10, 20 (See FIG. 1), preferably provided as an integral unit with the keyboard 156. An optional audio transducer 196, which may act as both a microphone and a speaker, is connected to bus 130 by audio controller 197, as illustrated.

It will be apparent to those reasonably skilled in the art that other input devices, such as a pen and/or tabloid and a microphone for voice input, may be connected to computer 100 through bus 130 and an appropriate controller and software, as required. DMA controller 160 is provided for performing direct memory access to RAM 110. A visual display is generated by video controller 165 that controls video display 170. Computer system 100 also includes a communications adaptor 190 that allows the system to be interconnected to a local area network (LAN) or a wide area network (WAN), or the Internet schematically illustrated by bus 191 and network 195.

Operation of computer system 100 is generally controlled and coordinated by operating system software. The operating system controls allocation of system resources and performs tasks such as processing scheduling, memory management, networking, and I/O services, among other things. In particular, an operating system resident in system memory and running on CPU 105 coordinates the operation of the other elements of computer system 100. The present invention may be implemented with any number of commercially available operating systems including Windows®, DOS, UNIX®, OS/2®, and so forth. One or more software applications may be executable under the direction of the operating system.

The present invention can interface with a variety of hardware platforms and software environments. A typical operating system may be used to facilitate communication with the pointing device. The present invention may also interact with an application program that is stored as executable instructions on a computer readable medium on a user's computer or server, such as mass storage devices or in memories. A suitable server system preferably includes a conventional server software program for administering the content and interaction carried out for a specific forum.

Figure 3:
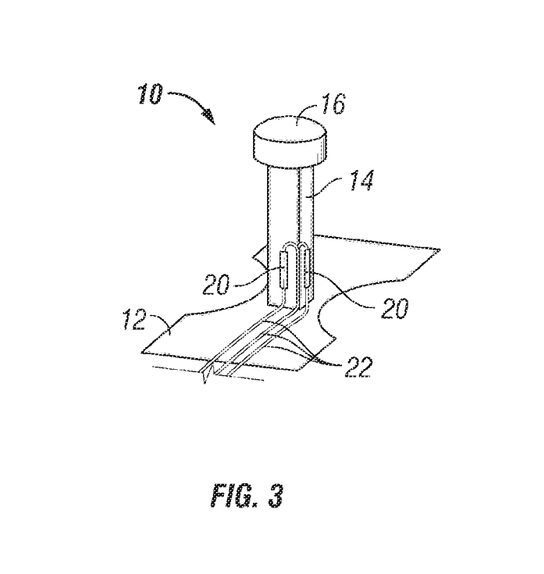
FIG. 3 illustrates one embodiment of the pointing stick having sensors configured for detecting movement of a shaft cantilevered to a base.

FIG. 3 illustrates one embodiment of a pointing stick 10 having sensors configured for detecting movement of a shaft cantilevered to a base. In particular, the pointing stick 10 includes a rigid base 12 and a thin shaft 14 affixed to base 12, with a cap 16 at the top of the shaft 14. A nub (not shown) may be removably fitted over the cap 16. The nub is typically contoured and textured, and may be made of a soft rubber, allowing a user's finger to comfortably and reliably grip the nub to impart a force to the shaft 14. The shaft 14 may be made of an elastic material such as polycarbonate, flexible metal, or other appropriate material. In one embodiment, the shaft 14 and the base 12 are formed as a unitary polycarbonate structure, such as may be economically manufactured in large quantities by injection molding. Alternatively, the shaft 14 could be made of metal, such as steel soldered to a steel base. Other means for securing the shaft 14 to the base will be apparent to one skilled in the art having the benefit of this disclosure. The height of the shaft 14, when installed in the key pad area, is typically no more than about 1 millimeter above the height of the surrounding keys. The edges of the surrounding keys may also be contoured to create extra room for the user's finger to engage or grab the nub. This allows easy access by the index finger or other fingers of a keyboard operator when the pointing function is to be used. The top of the shaft is low enough, however, that it typically will not interfere with the normal movement of the fingers during typing on the keyboard.

The pointing stick 10 in FIG. 3 includes two sensors 20. In this embodiment, the sensors 20 are disposed longitudinally on the shaft 14, while in other embodiments, sensors coupled to a pointing stick may be disposed elsewhere. Electrical leads 22 extend from the sensors 20 to a processor 24 included with the computer for processing signals from the sensors 20. Generally, piezoelectric sensors and other sensors for detecting deflection or displacement of a member are well known in the art. As incorporated in the embodiment of the pointing stick 14, forces applied to the shaft 14 by a user's finger cause changes in voltage or resistance across the sensors 20, generating electrical signals at the leads 22. The resulting electrical signals reflect the direction and amount of force applied to the pointing stick shaft 14. The generated signals are transmitted by leads 22 to the processor 105 via the controller 155 (See FIG. 2) for controlling the display of a graphical interface on the video display 170.

Figure 4:
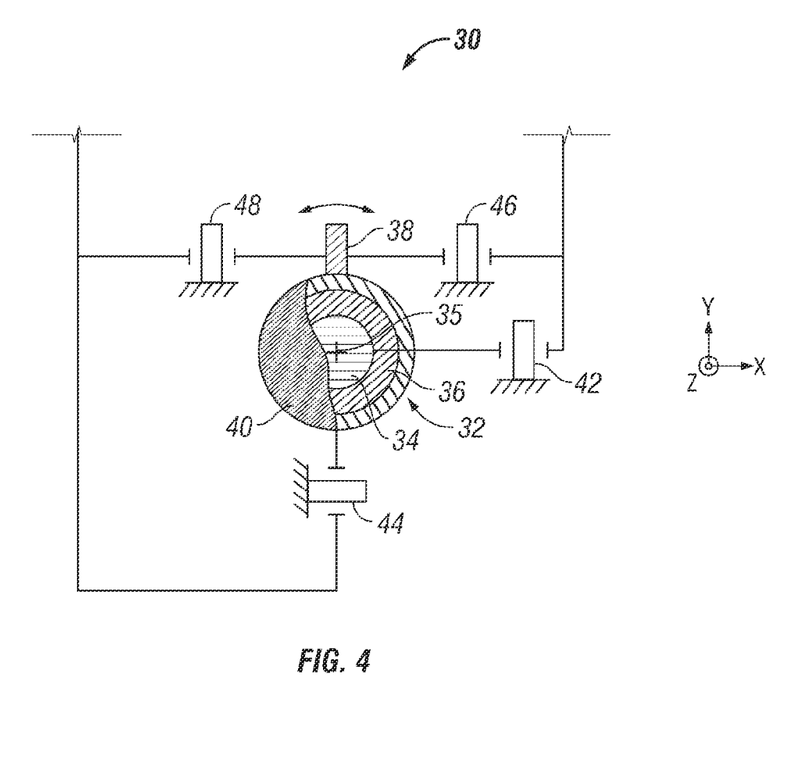
FIG. 4 is a schematic diagram of a pointing device including piezoelectric sensors for providing both translational and rotational input.

FIG. 4 is a schematic diagram of a pointing device 30 that incorporates piezoelectric sensor technology for both translational and rotational input. The pointing device 30 may be included with the computer 100 of FIG. 2, electronically coupled with the CPU 105 to manipulate graphical objects on the display 170. The figure shows a partially cut-away top view of a pointing stick 32. The pointing stick 32 includes an innermost shaft 34, which may be flexible and cantilevered to a base at a supported end. In the orientation drawn, the pointing stick 32 extends generally in the "z" direction (i.e., out of the page). An outer collar 36 is rotatably supported on the shaft 34. An arm 38 is secured to the collar 36, such that the collar 36 and the arm 38 may be rotated together at least slightly about shaft 34, which in this embodiment is generally about an axis 35. An optional spring (not shown) may be included for biasing the collar 36 to a neutral rotational position. Alternatively, the collar 36 may rotate freely 360 degrees and beyond about the shaft 34, and the processor 105 may selectively, periodically cancel or "zero" the rotational input provided by the pointing stick 32. A nub 40 is removably positioned on the rotatable collar 36 at the free end of the pointing stick 32. The nub 40 may be made of a pliable material such as rubber, for a snug, removable, frictional fit with the collar 36. The nub 40 may also be texturized for an enhanced feel and grip by a user's finger.

A user may apply a lateral force (i.e. in the x- and/or y-direction) to the pointing stick 32 with a single finger, engaging the nub 40 to flex the shaft 34 and laterally displace the pointing stick 32. The user may also apply a rotational force by engaging the nub 40 with a user's finger and twisting the user's finger. The pointing device 30 includes translational sensors 42, 44 coupled to the shaft 34. The pointing device 30 also includes rotational sensors 46, 48 coupled to the rotatable collar 36 via the arm 38. The sensors 42, 44, 46, and 48 are shown as piezoelectric sensors, which may be electronically coupled to the processor 105 of the computer system 100 shown in FIG. 2. Thus, the user may provide input to the pointing device 30 for manipulating output of the display 170. When a user applies a lateral force to the pointing stick 32, the translational sensor 42 detects any x-component of the displacement, and the translational sensor 44 detects any y-component of the displacement. When a user applies a rotational force to the pointing stick 32, the rotational sensor 46 detects rotational displacement in one direction, and the rotational sensor 48 detects rotational displacement in the opposite direction. With simple gestures and combinations of gestures, the user may thus provide translational input, rotational input, or combinations thereof. The combinations of rotational and translational input may be combined simultaneously or sequentially.

Although the pointing stick 32 of FIG. 4 includes the collar 36 rotatable about a fixed, cantilevered shaft 34, other embodiments of a pointing stick may include a flexible, cantilevered shaft with no rotatable collar. In such other embodiments, the flexible shaft may be configured so that a user may displace the shaft both rotationally, by twisting the flexible shaft about its supported end, and laterally, by applying a linear force component in the x or y direction. Rotational sensors coupled to the shaft could detect twisting of the shaft, to generate signals corresponding to rotation. Translational sensors coupled to the shaft could detect lateral deflection of the shaft to generate signals corresponding to translation.

A potentiometer is another type of device that may be incorporated in embodiments of the invention to provide rotational input. A potentiometer is an electronic device that typically includes a rotatable portion, such as a shaft, that is rotated to control an electrical parameter, such as voltage or resistance. A potentiometer may be a constant resistance potentiometer, a constant current potentiometer, a microvolt potentiometer, a thermocouple potentiometer, or other potentiometers known in the art. Alternatively, other electrical components having a rotatable portion for modulating an electrical parameter may be substituted for a potentiometer. For example, a varistor and a variable capacitor are two other types of electrical components that are sometimes incorrectly referred to as a potentiometer due to their similar appearance. These or other rotatable electrical components may be used according to the invention to convert rotational motion of a pointing stick caused by a user's finger into an electronic input signal representative of that motion.

Figure 5:
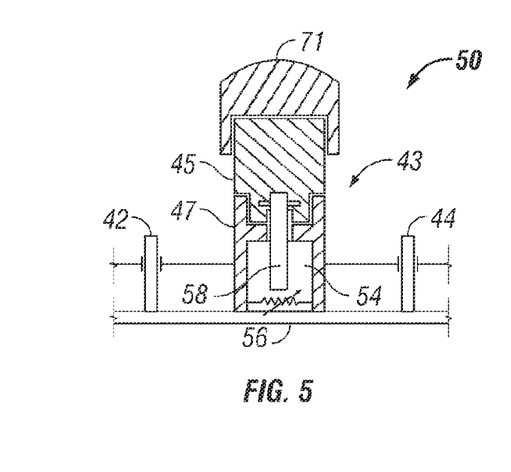
FIG. 5 is a schematic diagram of a pointing device including piezoelectric sensors for providing translational input and a potentiometer for providing rotational input.

FIG. 5 is a schematic diagram of a pointing device 50 that incorporates the piezoelectric sensors 42, 44 for providing translational input and a potentiometer 54 for providing rotational input. The pointing device 50 may be included with the computer 100 of FIG. 2, and electronically coupled with the CPU 105 to manipulate graphical objects on the display 170. FIG. 5 includes some of the mechanical and electromechanical attributes of this embodiment of the pointing device 50. A stick or shaft 43 includes an upper shaft portion 45 rotatably coupled to a lower shaft portion 47. A nub 71 is secured, by friction adhesive or otherwise, to an upper end of the shaft 43, allowing a user to apply a rotational force to the upper shaft portion 45. A potentiometer 54 is disposed in the lower shaft portion 47. The potentiometer 54 includes an axle 58 extending into and secured with the upper shaft portion 45. The axle 58 may be fixed to the upper shaft portion 45 via a pin as shown, or with other means such as epoxy or simply a tight press-fit. Thus, rotation of the upper shaft portion 45 with respect to the lower shaft portion 47 rotates the axle 58, to modulate an electronic parameter of the potentiometer 54 and generate a signal representative thereof. The generated signals may be passed to the CPU 105. The potentiometer 54 may be electronically coupled to the CPU 105 along electronic pathways of a chassis or a substrate 56 under the keyboard. Thus, the user may provide rotational input by contacting the nub 40 with a finger and performing a rotating gesture, to rotate the axle 58 of the potentiometer. The piezoelectric-based translational sensors 42, 44 are mechanically coupled to the shaft 43 at the lower shaft portion 47, so that the user may also provide translational input by applying a lateral force to the nub 40.

The embodiment of FIG. 5 desirably prevents or minimizes the likelihood that a translational gesture will inadvertently induce rotational signals, and vice versa. By containing the potentiometer 54 within the shaft 43, the potentiometer 54 moves laterally with the shaft 43. Thus, a lateral force applied to the shaft 43 may displace the shaft 43 laterally, without causing significant rotation (or without generating a signal indicative of rotation) of the axle 58. Likewise, a rotational force applied to the shaft 43 may rotate the upper shaft portion 45 without inducing a significant lateral displacement (or without generating a signal indicative of lateral displacement) of the shaft 43.

Figure 6:
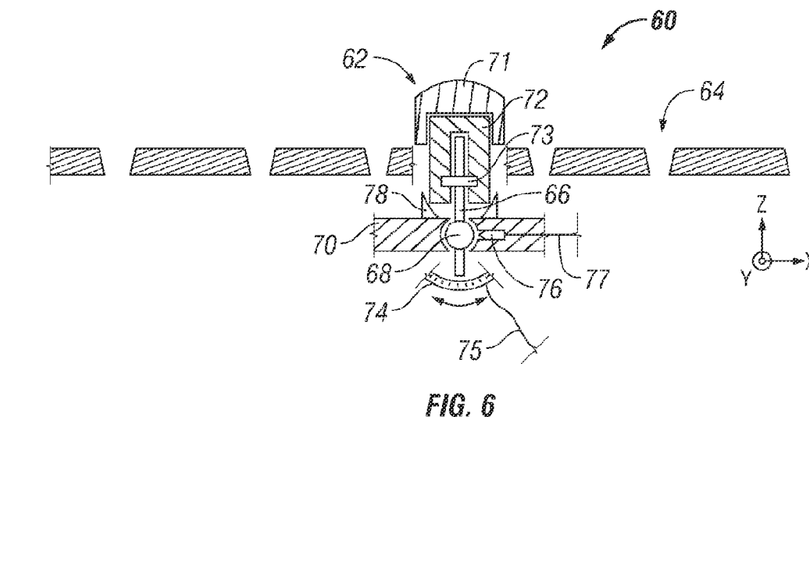
FIG. 6 is a schematic side view of an alternative embodiment of a pointing device for providing translational and rotational input to the processor to manipulate graphical objects on the display.

FIG. 6 is a schematic side view of an alternative embodiment of a pointing device 60 for providing translational and rotational input to the processor 105 to manipulate graphical objects on the display 170 (FIG. 2). A pointing stick 62 is centrally disposed between adjacent keys of a keyboard 64. The pointing stick includes an inner shaft portion 66 that is pivotally supported at a 360-degree pivot ball 68 mounted in a socket on a chassis 70. An outer shaft portion 72 is disposed on the inner shaft portion 66 and secured with a pin 73. The outer shaft portion 72 extends above the keyboard 64 slightly to be accessible to the user. A nub 71 is removably disposed on the outer shaft portion 72. A translational sensor 74 senses x/y translation of the shaft 66 and generates signals responsive thereto at the electrical lead 75, which is electrically coupled to the processor 105. A rotational sensor 76 is embedded in the substrate to sense rotation of the shaft 66 or ball 68. The rotational sensor generates signals responsive to the rotation at an electrical lead 77 that is electrically coupled to the processor 24. Thus, a user may apply a lateral force, a rotational force, or combinations thereof to the nub 71, to provide rotational and translational input. A pliable elastomer spring or biasing member 78 may be provided for biasing the pointing stick 62 to an upright direction. Other types of springs known in the art may alternatively be used for biasing the pointing stick 62 upright.

It should be observed that in structural mechanics and dynamics, a force on a member produces both a stress (force per unit area) and a strain (displacement). Every applied force results in a displacement, no matter how slight. Likewise, a torque (rotational force) always results in a rotational displacement, no matter how slight. Thus, embodiments of the invention may be configured to generate signals in response to rotation, torque, or both. In rigid, non-rotatable pointing sticks such as that of FIG. 3, the torque applied by a finger may therefore result in very slight almost imperceptible rotation. The rotational sensors of FIGS. 3 and 4 are responsive at least primarily to torque, in that the properties of a piezoelectric material varied according to the stress/torque applied. In the embodiment of FIG. 5 and 6, by contrast, the rotational sensor may be responsive primarily to rotational displacement of an axle or other rotatable member. Thus, as used to describe embodiments of the invention herein, "rotational sensors" refer to sensors configured for sensing rotation or torque, or possibly both, and the signal(s) generated in response may be referred to as a "rotational signal."

Figure 7:
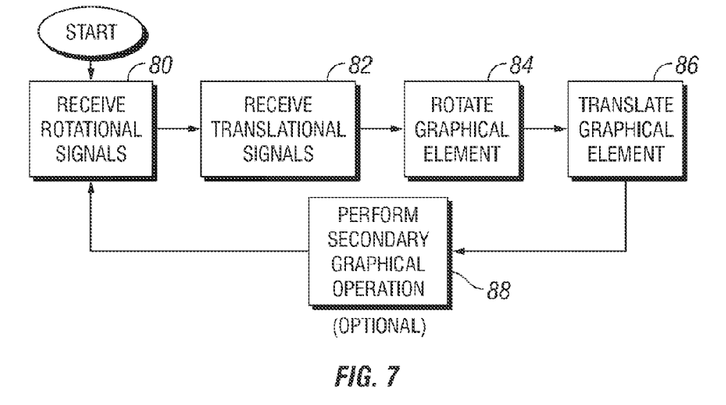
FIG. 7 is a flowchart describing a method for a machine to manipulate graphical elements of a display.

FIG. 7 is a flowchart describing a method for a machine to manipulate graphical elements of a display. In step 80, a computer receives rotational signals from a rotational sensor in response to a rotation or a torque, such as may be applied about a pointing stick. In step 82, the computer receives translational signals from a translational sensor in response to lateral forces applied to the pointing stick. Step 82 may be performed concurrently with or prior to step 80, as well as with other steps of FIG. 8. In step 84, a graphical element on a computer display is rotated according to the rotational signals. In step 86, the graphical element is translated according to the translational signals. Steps 84 and 86 may also be performed concurrently or in any order. A software application typically determines how the signals are processed, such as to rotate or translate graphical elements, in response to input from the pointing device and any other peripherals, such as a keyboard. In optional step 88, the software application may combine the rotational and translational input to perform manipulations other than move graphical object(s) according to the sum of the rotational and translational components. For example, higher-order functions may be specified by the software program according to the combination of rotation and translation, as well as according to the amount or degree of those displacements. The outlined in FIG. 8 is generally performed in a continuous loop, such that signals are continuously being received to continuously manipulate the graphical elements.

Figure 8:
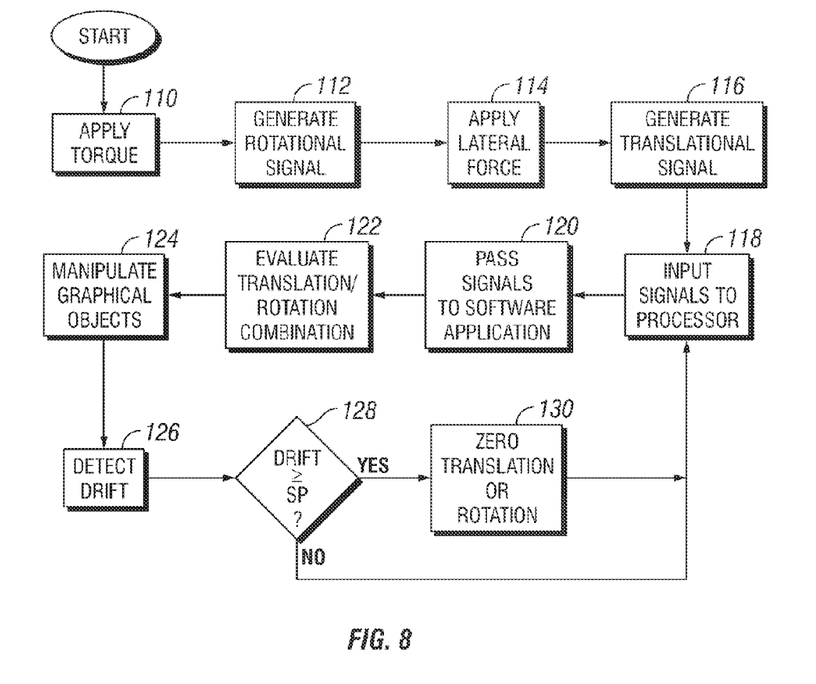
FIG. 8 is a flowchart describing an alternative embodiment of a method for manipulating graphical elements of a display using a pointing device interfaced with a computer.

FIG. 8 is a flowchart describing an alternative embodiment of a method for manipulating graphical elements of a display using a pointing device interfaced with a computer. The steps of the method outlined in FIG. 9 may be performed by an application program residing on the computer, by hardware components of the computer, and/or by a human user operating the computer. In step 110, a user may apply a rotational force to a pointing stick. In step 112, the pointing device (hardware) generates rotational signals in response to the rotational force applied by the user in step 110. Likewise, in step 114, the user may apply a lateral force, including x- and/or y-components. In step 116, the pointing device generates translational signals in response to the lateral force. In step 118, these signals are input to a processor residing on the computer. The processor may manipulate the signals and convert them into a form useable by the application program. For example, the translational and rotational sensors may be analog devices that pass analog signals to the processor. The processor may transform the analog signals to digital signals that are understandable by the application program. Then the transformed signals are passed to the application program in step 120. In step 122, the application program determines whether the combination of translational and rotational signals is to activate a secondary function other than pure translation or rotation. In step 124, the graphical objects are manipulated by the application program and processor. For example, a graphical object may be translated, rotated, or some other function may be performed according to the combination of signals. In step 126, which may occur continuously, the computer detects any drift, which in one embodiment may take the form of a prolonged, steady signal uncharacteristic of normal input by the human user. Drift may be handled in a number of ways. For example, in step 126, if the drift exceeds a set point, such as a time value corresponding to the duration of perceived drift, then the computer may perform step 130 to cancel any translational or rotational signals to stop the drift. After any drift is cancelled, the process continues. Signals continue being input to the processor in response to the user's actions, the processor converts these to useable signals, and the application program computes the signals to manipulate the graphical objects on the display.

As illustrated by the exemplary embodiments discussed herein, the invention provides an improved pointing device with increased functionality, more intuitive design, and more efficient operation. Embodiments of a pointing stick for sensing rotational and translational motion allow the user to provide this enhanced input without leaving the "home position" of a keyboard. Piezoelectric sensors, potentiometers, and other sensors may be integrated with embodiments of the pointing device so that rotational and translational input may be provided with a single finger. Other embodiments may provide a pointing stick that can be grabbed by more than one finger, for increased leverage. A pointing stick according to the invention may be supported at one end to a base in a cantilevered fashion, to minimize the amount of displacement necessary. Thus, embodiments of the pointing stick may be compact enough to position between keys of a keyboard. Other embodiments may incorporate a ball-and-socket allowing a pointing stick to be toggled in the x- and y-directions for providing translational input. The pointing stick may also be rotatable about a central axis to provide rotational input. In some embodiments, a rotatable member may provide a full 360 degrees of rotation to the pointing stick, while in other embodiments a very slight, almost imperceptible torque applied to a cantilevered pointing stick may be sufficient to provide rotational input. Embodiments of the pointing device according to the invention may retain a familiar layout, for easier acceptance by the computing public, and for minimizing any learning curve required to use the improved device. These and other advantages will be apparent to one of ordinary skill in the art upon reading this disclosure. These features and advantages are not necessarily intended in a limiting sense, however, and various features, advantages, and combinations of features and advantages may vary from embodiment to embodiment.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention. It should also be understood that the term "rotational sensor," as used herein, is a sensor that detects rotation, but the term does not necessarily require that the sensor itself rotate. Similarly, it should also be understood that the term "translational sensor," as used herein, is a sensor that detects translation, but the term does not necessarily require that the sensor itself be translated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pointing device for providing input to a computer, comprising:
    a pointing member coupled to a computer keyboard, the computer keyboard having a plurality of keys, the pointing member including a cantilevered shaft extending below the keys and having a supported end secured to a base beneath the keys and a free end accessible by hand, the free end freely rotatable 360 degrees relative to the supported end about an axis of the shaft; and
    a plurality of sensors coupled to the pointing member and electronically coupled to a central processing unit on the computer for sensing the movement of the shaft and outputting an electronic signal to the central processing unit representative of the movement, the plurality of sensors including at least one rotational sensor configured for sensing rotational movement of the free end of the shaft relative to the supported end of the shaft about an axis of the shaft and at least one translational sensor configured for sensing lateral displacement of the shaft.

2. The pointing device of claim 1, wherein the at least one rotational sensor comprises a piezoelectric transducer, such that torque applied by hand to the free end of the shaft about the axis of the shaft displaces the piezoelectric transducer for generating a signal indicative of the torque.

3. The pointing device of claim 1, wherein the at least one rotational sensor comprises a first rotational sensor member rotatably secured to a second rotational sensor member, whereby rotation of the first rotational sensor member with respect to the second rotational sensor member modulates an electrical parameter, and wherein the free end of the shaft is coupled to the first rotational sensor member such that rotation of the free end of the shaft relative to the supported end of the shaft about the axis of the shaft rotates the first rotational sensor member with respect to the second rotational sensor member.

4. The pointing device of claim 3, wherein the at least one rotational sensor comprises a potentiometer or a varistor.

5. The pointing device of claim 1, wherein the shaft further comprises a lower shaft portion that includes the supported end secured to the base and an upper shaft portion that includes the free end rotatably coupled to the lower shaft portion about the axis of the shaft.

6. The pointing device of claim 5, wherein the upper shaft portion is mechanically coupled to the at least one rotational sensor and the lower shaft portion is mechanically coupled to the at least one translational sensor.

7. The pointing device of claim 5, wherein the upper shaft portion comprises an outer collar rotatably supported on the lower shaft portion.

8. The pointing device of claim 1, wherein the shaft is centrally disposed between adjacent keys of the computer keyboard.

9. The pointing device of claim 1, further comprising:
    a multi-directional pivot for pivotably supporting the body of the pointing member, wherein the translational sensor senses pivoting of the pointing member.

10. The pointing device of claim 9, wherein the multi-directional pivot includes a ball and socket joint.

11. The pointing device of claim 10, wherein the ball is rotatable within the socket, and the rotational sensor senses rotation of the shaft or the ball.

12. The pointing device of claim 1, wherein the plurality of signals are analog signals, the device further comprising:
    an analog to digital converter for converting the analog signals to a computer-readable digital signal.

13. The pointing device of claim 1, wherein the at least one rotational sensor is contained within the shaft.

14. The pointing device of claim 1, further comprising:
    a display for displaying a graphical object; and
    wherein the central processing unit is configured to rotate the graphical object in response to the sensed rotational movement of the free end of the shaft, and translate the graphical object in response to the sensed lateral displacement of the shaft.

\* \* \* \* \*